United States Patent

Ossoinig et al.

[11] Patent Number: 6,112,100
[45] Date of Patent: *Aug. 29, 2000

[54] METHOD AND APPARATUS FOR SYNCHRONIZING A BASE STATION IN A COMMUNICATION SYSTEM

[75] Inventors: Karl Heinz Ossoinig; Steven Jeffrey Goldberg, both of Fort Worth; Thomas Casey Hill, Trophy Club, all of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/012,514

[22] Filed: Jan. 23, 1998

[51] Int. Cl.$^7$ ...................................... H04B 7/00
[52] U.S. Cl. ........................ 455/502; 455/524; 370/350; 370/503; 375/356
[58] Field of Search ..................................... 455/502, 503, 455/524, 67.1, 67.3; 370/350, 503, 328; 375/356, 365

[56] References Cited

U.S. PATENT DOCUMENTS 5,363,376  11/1994  Chuang et al. ..................... 455/67.3
5,608,765   3/1997  Tanoue ............................... 375/365

OTHER PUBLICATIONS

Yoshihiko Akaiwa et al., "Autonomous Decentralized Inter–Base–Station Synchronization for TDMA Microcellular Systems" pp. 257–262, IEEE Proceedings, 1991, USA.

*Primary Examiner*—Lee Nguyen
*Attorney, Agent, or Firm*—R. Louis Breeden

[57] ABSTRACT

A method and apparatus synchronize a first floating timing reference (207) of a first base station (116) with a timing reference of a second base station (116) of a communication system, without requiring an interruption of normal user traffic through the communication system. A receiver (208) of the first base station monitors (402) a user traffic transmission of the second base station, thereby generating a received signal, and a processing system (206) of the first base station derives (410) a received timing reference (308) from the received signal. The processing system independently adjusts (426, 428) the first floating timing reference according to the received timing reference, without requiring a timing adjustment instruction from a centralized synchronization controller.

19 Claims, 4 Drawing Sheets

METHOD AND APPARATUS FOR SYNCHRONIZING A BASE STATION IN A COMMUNICATION SYSTEM

FIELD OF THE INVENTION

This invention relates in general to radio communication systems, and more specifically to a method and apparatus for synchronizing a first floating timing reference of a first base station with a timing reference of a second base station of a communication system.

BACKGROUND OF THE INVENTION

Present simulcast systems require intervention from a central controller to synchronize their timing references at transmitter sites. This typically is accomplished through measurements taken at a plurality of receiver sites and through control instructions sent from the central controller to the transmitter sites. The central controller instructs certain transmitter sites to send measurement signals, and other receiver sites to monitor and determine the reception time of the signals. Subtracting the known propagation time between the sites, the system can compute the time offsets from the sending sites. The central controller then sends instructions to the sending sites for adjusting their timing references to achieve synchronization.

There are several disadvantages with this procedure. Normal user traffic through the transmitters is interrupted during the adjustment process, thereby reducing the overall system capacity. The transmitters and receivers must be instructed by the central controller to listen or receive signals for measurement purposes. This means the transmitters and receivers cannot do adjustments to their timing references without being instructed by the controller. Usually the controller initiates synchronization on some predetermined time rotation basis. If, however, a site has some indication that it has lost synchronization, it must somehow get a message back to the controller and receive instructions before it can resynchronize. The required ongoing central control also requires an additional amount of bandwidth in the links to the sites.

Separate systems that utilize synchronous protocols, such as Motorola's well-known FLEX™ protocol, also require synchronization with one another for reasons other than for providing acceptable simulcast transmission. Such systems are required to maintain a common synchronization with one another so that a subscriber unit moving from one system to a next system will not encounter large shifts in synchronization timing, forcing a time-consuming and battery-consuming re-aquisition of synchronization with the next system.

Thus, what is needed is a method and apparatus for synchronizing the transmitters without requiring an interruption of normal user traffic through the system. Preferably, the method and apparatus will operate without the need for ongoing central control intervention, and without an exchange of timing information between a central controller and the transmitters. A method and apparatus for maintaining a common synchronization among multiple separate systems is also needed.

SUMMARY OF THE INVENTION

An aspect of the present invention is a method for synchronizing a first floating timing reference of a first base station with a timing reference of a second base station of a communication system, without requiring an interruption of normal user traffic through the communication system. The method comprises in the first base station the steps of monitoring a user traffic transmission of the second base station, by a receiver of the first base station, thereby generating a received signal; and deriving a received timing reference from the received signal. The method further comprises in the first base station the step of independently adjusting the first floating timing reference according to the received timing reference, without requiring a timing adjustment instruction from a centralized synchronization controller.

Another aspect of the present invention is a first base station for synchronizing a first floating timing reference the first base station with a timing reference of a second base station of a communication system, without requiring an interruption of normal user traffic through the communication system. The first base station comprises a receiver for monitoring a user traffic transmission of the second base station, thereby generating a received signal; and a processing system coupled to the receiver for deriving a received timing reference from the received signal. The first base station further comprises the first floating timing reference coupled to the processing system for providing a timing signal for the base station, and a transmitter coupled to the processing system for transmitting user traffic in synchronism with a transmitter of the second base station. In addition, the first base station comprises a controller interface coupled to the processing system for receiving the user traffic from a system controller. The processing system is programmed to independently adjust the first floating timing reference according to the received timing reference, without requiring a timing adjustment instruction from a centralized synchronization controller.

DETAILED DESCRIPTION OF THE DRAWINGS

Figure 1:
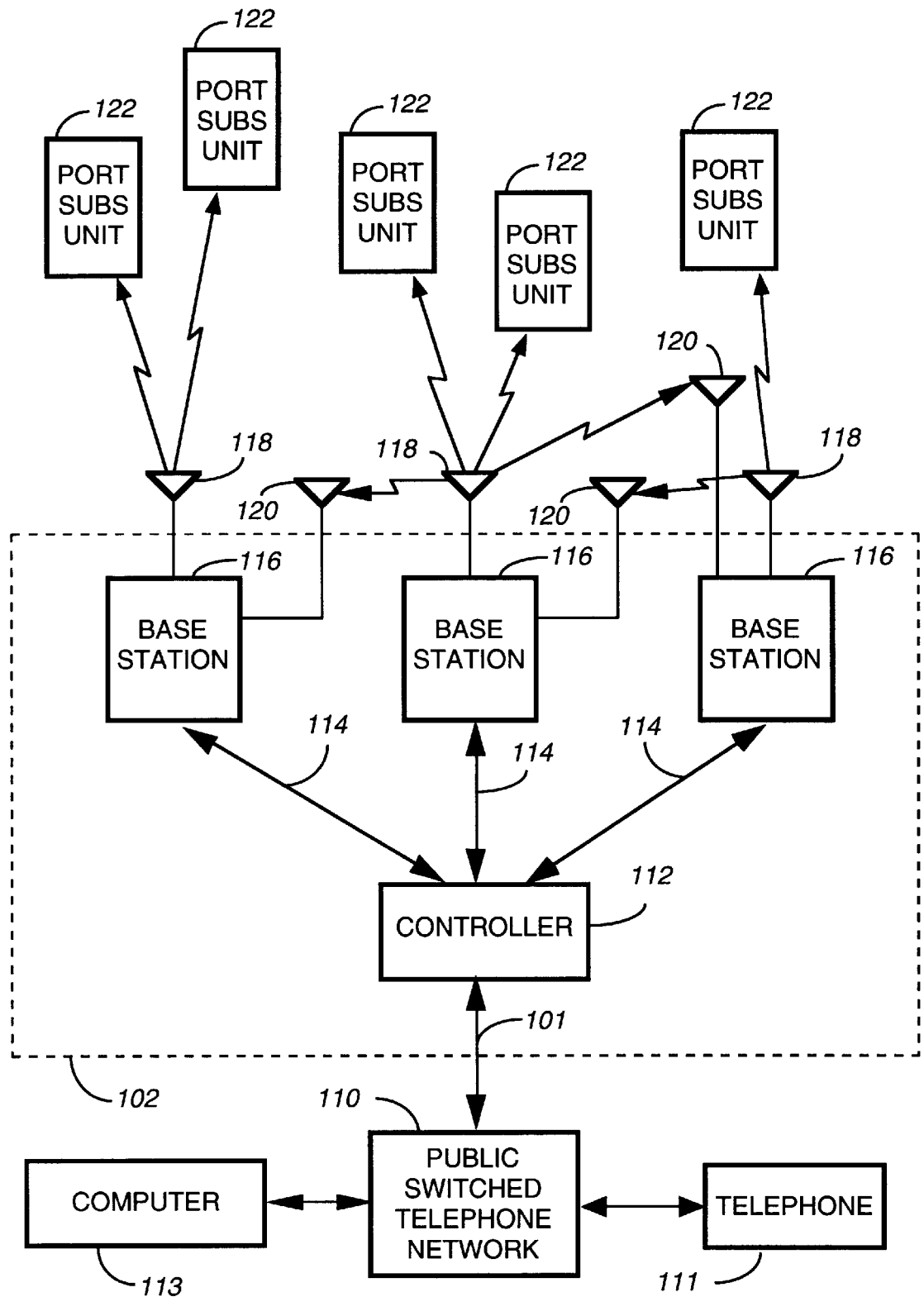
FIG. 1 is an exemplary electrical block diagram of a communication system in accordance with the present invention.

Referring to FIG. 1, an electrical block diagram of an exemplary communication system in accordance with the present invention comprises a fixed portion 102 including a controller 112 and a plurality of base stations 116, and a portable portion including a plurality of portable subscriber units 122. The base stations 116 preferably communicate with the portable subscriber units 122 utilizing conventional radio frequency (RF) techniques, and are coupled by communication links 114 to the controller 112, which controls the base stations 116. It will be appreciated that, alternatively, the base stations 116 can communicate with the portable subscriber units 122 by other wireless communication techniques, e.g., infrared techniques, as well.

The hardware of the controller 112 is preferably a combination of the Wireless Messaging Gateway (WMG™) Administrator! paging terminal, and the RF-Conductor!™ message distributor manufactured by Motorola, Inc., and the controller 112 includes software modified in accordance with the present invention. The hardware of the base stations 116 is preferably a combination of the RF-Orchestra! transmitter and RF-Audience!™ receiver manufactured by Motorola, Inc., and the base stations 116 include software modified in accordance with the present invention. The portable subscriber units 122 are preferably similar to Tenor™ voice messaging units and Pagefinder™ data messaging units, also manufactured by Motorola, Inc. It will be appreciated that other similar hardware can be utilized as well for the controller 112, the base stations 116, and the portable subscriber units 122.

Each of the base stations 116 transmits RF signals to the portable subscriber units 122 via a transmitter antenna 118. The base stations 116 also receive RF signals from other nearby base stations via the receiver antenna 120, in accordance with the present invention. The RF signals transmitted by the base stations 116 to the portable subscriber units 122 comprise selective call addresses identifying the portable subscriber units 122, and voice and data messages originated by a caller, as well as commands originated by the controller 112 for adjusting operating parameters of the communication system. While, by way of example, FIG. 1 depicts a one-way communication system, it will be appreciated that the present invention applies to two-way communication systems as well.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 113 coupled to the PSTN 110. It will be appreciated that, alternatively, other types of communication networks, e.g., packet switched networks and local area networks, as well as the Internet, also can be utilized for transporting originated messages to the controller 112.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well.

Figure 2:
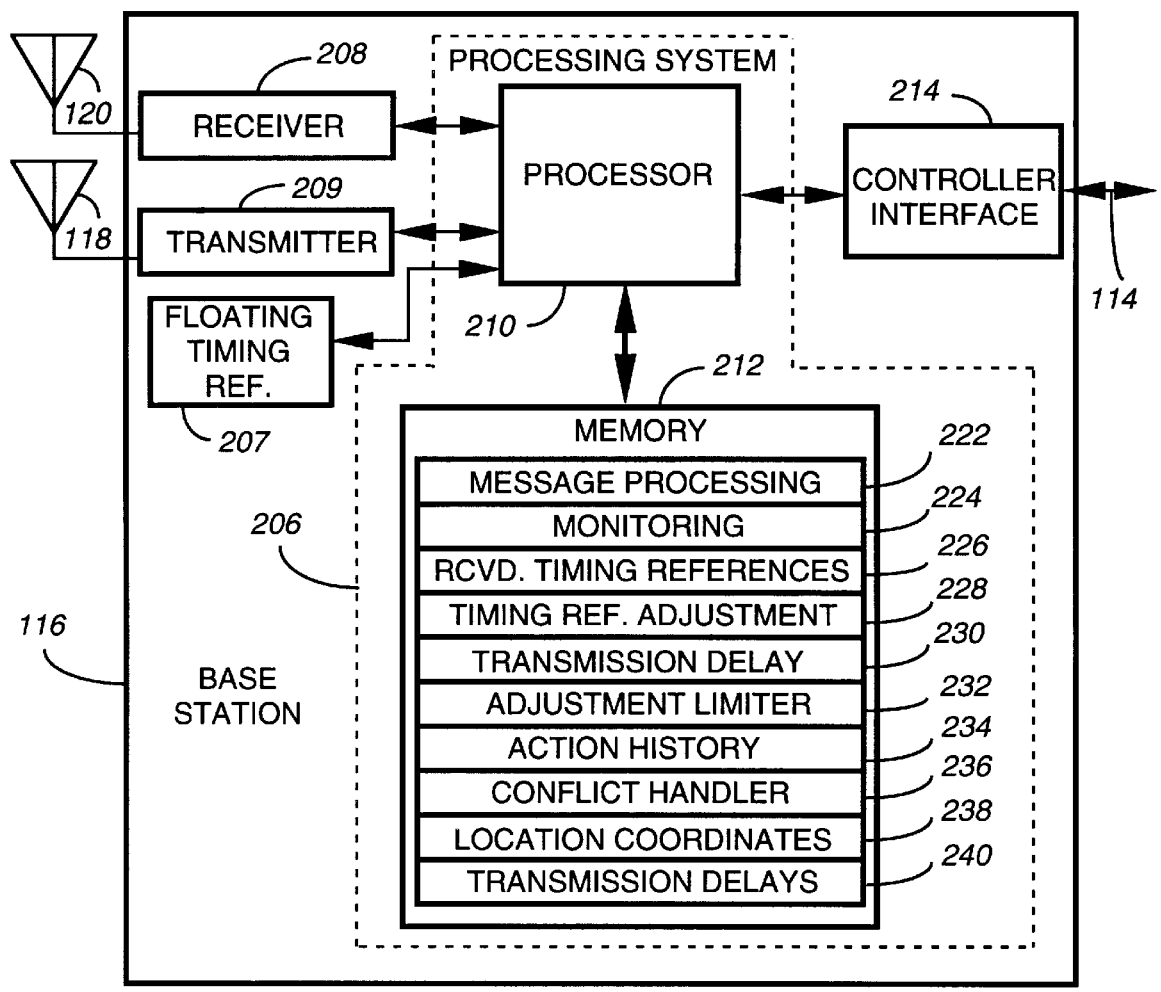
FIG. 2 is an exemplary electrical block diagram of a base station in accordance with the present invention.

FIG. 2 is an exemplary electrical block diagram of the base station 116 in accordance with the present invention. The base station 116 comprises a conventional RF transmitter 209 coupled to the transmitter antenna 118 for transmitting user traffic comprising messages to the portable subscriber units 122, using well-known techniques. The base station 116 further comprises a conventional RF receiver 208 coupled to the receiver antenna 120 for monitoring user traffic transmissions of other nearby base stations 116, thereby generating a received signal. The receiver 208 is coupled to a processing system 206 for deriving a received timing reference from the received signal. The transmitter 209 is coupled to the processing system 206 for transmitting user traffic in synchronism with the transmitter 209 of at least one other base station 116, in accordance with the present invention. The base station 116 also includes a conventional floating timing reference 207 coupled to the processing system 206 for providing a timing signal for the base station 116. A conventional controller interface 214 also is coupled to the processing system 206 for receiving the user traffic from the controller 112.

The processing system 206 comprises a conventional processor 210 coupled to a conventional memory 212. The memory 212 comprises locations for storing variables and software elements for programming the processing system 206 in accordance with the present invention. The memory 212 includes a message processing element 222 for processing the user traffic handled by the base station 116. The memory 212 further includes a monitoring element 224 for controlling the receiver 208 to monitor a user traffic transmission of a nearby base station to generate a received signal in accordance with the present invention. The memory 212 further comprises a received timing references element 226 for deriving a received timing reference from the received signal, as described further below. The memory also includes a timing reference adjustment element 228, preferably for adjusting the floating timing reference 207 according to the received timing reference. It will be appreciated that, alternatively, the timing reference adjustment element 228 can leave the floating timing reference 207 unaltered, while adjusting an offset from the floating timing reference 207, which offset is used to derive the base station synchronization timing reference from the floating timing reference 207.

The memory 212 further comprises a transmission delay element 230 for correcting the received timing reference according to an estimated transmission delay between the first and second base stations. The memory also includes an adjustment limiter element 232 for limiting the adjustment of the first floating timing reference to no more than a predetermined limit, e.g., 10 microseconds per adjustment when synchronized and transmitting. In addition, the memory 212 includes an action history element 234 for maintaining a history of actions taken during previously executed adjusting steps, comparing an action indicated for a current adjusting step with the history of actions, and generating an alert when the comparing step detects that the action indicated is not converging on synchronization of the base stations. The memory 212 further comprises a conflict handler 236 for handling adjustment conflicts in a preprogrammed manner, as described further below.

The memory preferably also includes a location coordinates element 238 for storing location coordinates describing the location of the base station 116 and for computing an estimated transmission delay between the base station 116 and another monitored base station 116. Each base station 116 preferably broadcasts its own location coordinates in a portion of the communication protocol, during outbound message transmissions, using well-known techniques. When monitoring another base station 116, a monitoring base station 116 can compute the distance between the base stations 116 by comparing its own location coordinates with those of the monitored base station 116. The monitoring base station 116 can then compute the transmission delay by dividing the distance by the speed of light. The memory 212 also includes a location for storing transmission delays 240 computed for monitored base stations 116. It will be appreciated that, alternatively, the transmission delays 240 can be pre-programmed into the base station 116 for corresponding nearby base stations 116.

Figure 3:
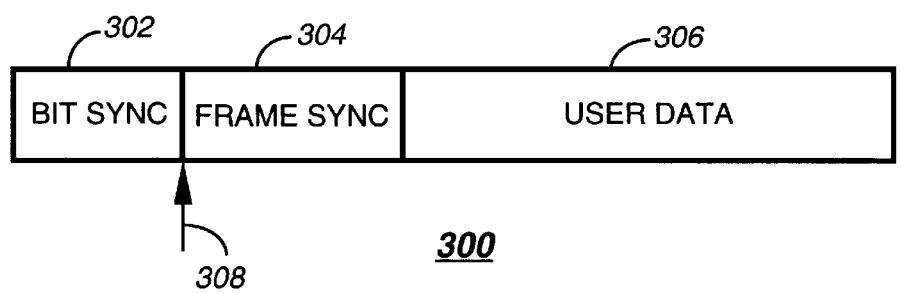
FIG. 3 is an exemplary protocol diagram in accordance with the present invention.

FIG. 3 is an exemplary protocol diagram 300 in accordance with the present invention. The diagram 300 comprises a bit sync portion 302 for synchronizing the portable subscriber units 122, as well as the receiver 208, with the outbound transmission bit rate, using well-known techniques. The diagram 300 further comprises a frame sync portion 304 for providing synchronization with a frame structure of the protocol and for communicating general information, e.g., location coordinates of the base station 116. In addition, the diagram 300 includes a user data portion 306 for transmitting user data, such as addresses and messages. A received timing reference 308 can be determined by a monitoring base station 116, for example, from the time at which a received bit sync portion 302 ends and a received frame sync portion 304 begins. The monitoring base station 116 can then compare the time at which the floating timing reference 207 of the monitoring base station 116 indicates the bit sync portion should have ended, with the time of the received timing reference 308, corrected for transmission delay. The difference between the two times is the adjustment needed to synchronize the floating timing reference to the corrected received timing reference 308.

Figure 4:
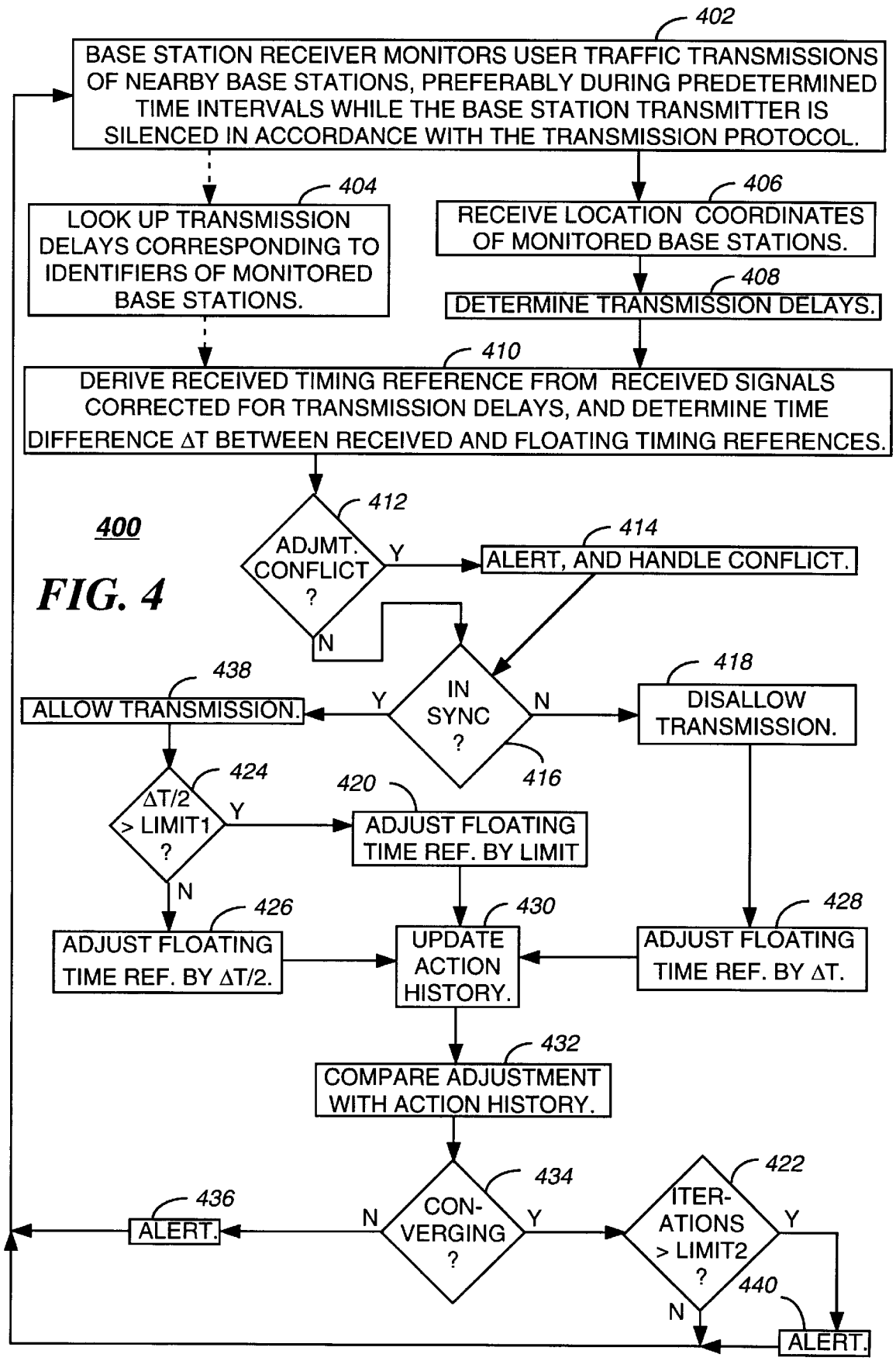
FIG. 4 is an exemplary flow diagram depicting operation of the base station in accordance with the present invention.

FIG. 4 is an exemplary flow diagram 400 depicting operation of the base station 116 in accordance with the present invention. The flow begins as the base station receiver 208 monitors 402 user traffic transmissions of the nearby base stations 116. While monitoring a single nearby base station 116 can produce acceptable results, monitoring multiple nearby base stations is preferred. Also preferred is for the communication system to be a system in which the transmission protocol requires both simulcast transmissions and non-simulcast, location-directed transmissions, e.g., a system utilizing the FLEX™ Protocol for Two-way Paging. In such systems the monitoring of each nearby base station 116 preferably occurs during predetermined time intervals while the monitoring base station transmitter 209 is silenced during ones of the location-directed transmissions of the nearby base station 116. Alternatively, in systems which do not perform non-simulcast, location-directed transmissions, well-known techniques, such as beam-forming, can be utilized to selectively receive a transmitter 209 of interest, while minimizing interference from other simultaneously-transmitting transmitters 209. It will be appreciated that in implementing a practical system a time-out (not shown) preferably is used to generate an alert when the receiver 208 has attempted to monitor the user traffic for longer than a predetermined time without receiving a signal.

During the monitoring process the monitoring base station 116 preferably receives 406 and stores the location coordinates of each of the monitored base stations 116. From the location coordinates of the monitored base stations 116 and its own location coordinates, the monitoring base station 116 can compute 408 the transmission delays between itself and each of the monitored base stations 116. It will be appreciated that, alternatively, the monitoring base station 116 can look up 404 the transmission delays corresponding to identifiers of the monitored base stations 116 in a pre-programmed table in the memory 212.

Next, the monitoring base station 116 derives 410 a received timing reference from the received signals of the nearby base stations 116, corrected for the transmission delays. The monitoring base station 116 then computes a time difference $\Delta T$ between each of the received timing references and the floating timing reference, as described herein above. Preferably, a single value is calculated for $\Delta T$ as a function, e.g., a linear averaging, of the corresponding plurality of received timing references. It will be appreciated that, alternatively, some other function, such as a weighted averaging or a predetermined non-linear approach can be used to calculate the value of $\Delta T$. Before settling on a single $\Delta T$ value, however, the base station 116 checks 412 whether there is an adjustment conflict, e.g., wide variations in the received timing references. If so, the base station 116 generates 414 an alert by, for example sending a message to the controller 112. The base station then handles the conflict by selecting a value for $\Delta T$ to adjust the floating timing reference in accordance with a pre-programmed technique, e.g., a table of $\Delta T$ weightings corresponding to selected base stations 116, for handling the adjustment conflict.

The base station 116 then checks 416 whether the monitoring base station 116 is in synchronization with the monitored base stations 116, within a predetermined tolerance, e.g., 5 microseconds. If so, the monitoring base station will be allowed 438 to transmit. The monitoring base station 116 then checks 424 whether the absolute value of $\Delta T/2$ is greater than a first predetermined limit, e.g., 10 microseconds. If so, the monitoring base station 116 adjusts 420 the floating timing reference 207 by the first predetermined limit in a direction corresponding to the sign of $\Delta T$. If not, the monitoring base station 116 adjusts 426 the floating timing reference 207 by $\Delta T/2$. In either case, the flow then proceeds to step 430. The reason for adjusting a synchronized and transmitting base station 116 by a fraction of the time difference $\Delta T$, i.e., $\Delta T/2$, instead of by the full $\Delta T$, is to prevent two base stations 116 monitoring each other from overcorrecting their respective timing references. For example, if two base stations 116 having floating timing references are 1 microsecond apart and they each adjust their timing references 207 towards one another by 1 microsecond, they will be 1 microsecond apart in the opposite direction after the adjustment. On the other hand, if they each adjust their floating timing references 207 towards one another by 0.5 microseconds, they will "meet in the middle" and become synchronized. Synchronization will still take place even if one of the base stations 116 uses a fixed timing reference. Convergence to synchronization will simply take longer in that case.

On the other hand, if at step 416 the monitoring base station 116 is not in synchronization with the monitored base stations 116, within the predetermined tolerance, then the monitoring base station 116 will not be allowed 418 to transmit. The monitoring base station 116 then adjusts 428 the floating timing reference 207 by $\Delta T$, and the flow proceeds to step 430. The reason an adjustment of the full $\Delta T$ is allowable in this case is that the base station 116 is unsynchronized and not transmitting. Thus, no other base stations 116 will be monitoring this base station 116 and adjusting their floating timing references 207 towards it.

At step 430 the monitoring base station 116 updates the action history stored in the memory 212. The monitoring base station 116 then compares 432 the adjustment made to the floating timing reference 207 with the action history to determine whether the monitoring base station 116 is converging (or maintaining convergence) to a synchronized state with the monitored base stations 116. Convergence is indicated, for example, when the adjustments are decreasing or very small. If in step 434 the timing reference 207 of the monitoring base station 116 is converging, the monitoring base station 116 checks 422 whether the number of iterations of the measurement process has exceeded a second predetermined limit, e.g., 10 iterations. If so, an alert is generated 440, and the flow returns to step 402 to monitor more user traffic. If not, the flow simply returns to step 402. If, on the other hand, at step 434 the floating timing reference 207 is not converging, the monitoring base station 116 generates 436 an alert, and then the flow returns to step 402 to monitor more user traffic. It will be appreciated that to ensure a sufficiency of user traffic to monitor, the controller 112 of the communication system is preferably programmed to generate "artificial" user traffic when actual user traffic through one of the transmitters 209 is below a predetermined threshold. It will be further appreciated that a base station 116 incorporating the present invention can be added to a suitable existing communication system, regardless of how the existing communication system is synchronized, and the base station 116 advantageously will automatically synchronize itself to the existing communication system.

Figure 5:
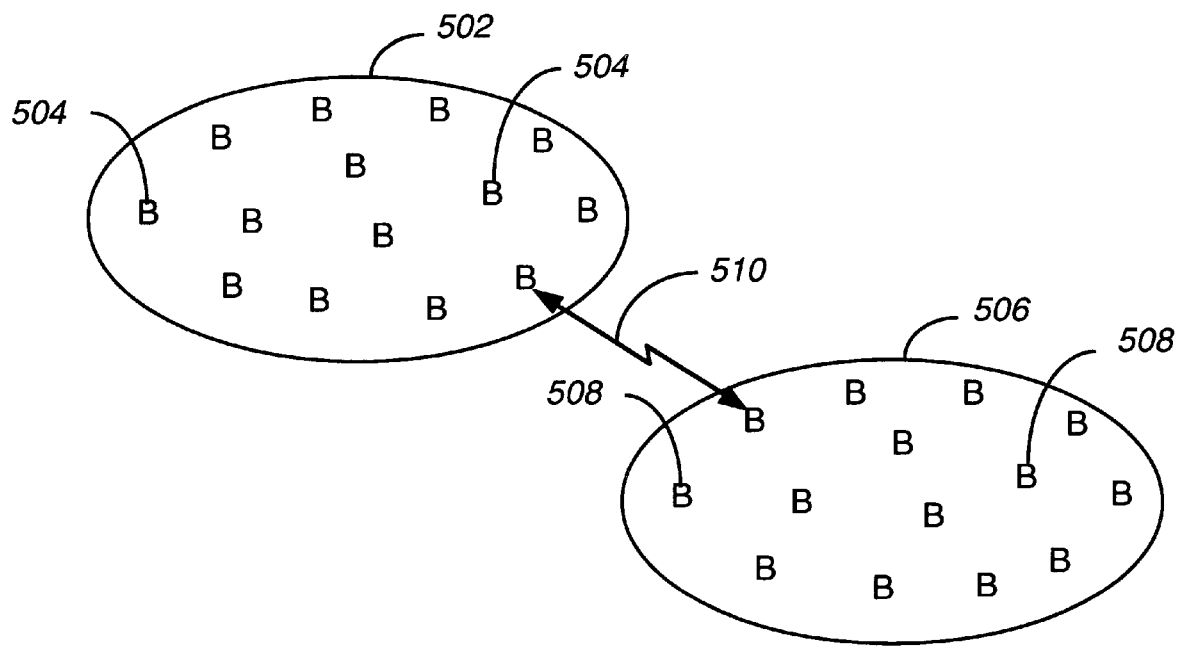
FIG. 5 is an exemplary plan diagram depicting first and second coverage areas of first and second communication systems in accordance with the present invention.

FIG. 5 is an exemplary plan diagram 500 depicting first and second coverage areas 502, 506 of first and second communication systems in accordance with the present invention. Base stations 504 of the first communication system preferably synchronize with one another to obtain a first common timing reference through the techniques described herein above, as do the base stations 508 of the second communication system to obtain a second common timing reference. In addition, the first and second common timing references are synchronized with one another by using similar techniques in accordance with the present invention to synchronize at least one of the base stations 504 with at least one of the base stations 508 through at least one transmission path 510. By synchronizing as few as one pair of the base stations 504, 508, the entire first and second communications systems advantageously can be kept synchronized with one another. It will be appreciated that, depending on the distance between the first and second communication systems, gain enhancing techniques, such as tall and directional antennas, may be required for the transmission path 510.

Thus, it should be clear from the preceding disclosure that the present invention provides a method and apparatus that can synchronize the transmitters of a communication system without requiring an interruption of normal user traffic through the system. Advantageously, the method and apparatus operate without a need for ongoing central control intervention, or any exchange of information between a central controller and the transmitters. In a similar manner, the method and apparatus also can maintain a common synchronization among multiple systems.

Many modifications and variations of the present invention are possible in light of the above teachings. Thus, it is to be understood that, within the scope of the appended claims, the invention can be practiced other than as described herein above.

What is claimed is:

1. A method for synchronizing a first floating timing reference of a first base station with a timing reference of a second base station of a communication system, without requiring an interruption of normal user traffic through the communication system, the method comprising in the first base station the steps of:

utilizing, for transmitting the normal user traffic, a transmission protocol that requires both simulcast transmissions and non-simulcast, location-directed transmissions, so that monitoring of the second base station can occur during predetermined time intervals when the first base station is silenced for ones of the location-directed transmissions of the second base station;

monitoring a user traffic transmission of the second base station only during said predetermined time intervals, by a receiver of the first base station, thereby generating a received signal;

deriving a received timing reference from the received signal; and independently adjusting the first floating timing reference by a predetermined fraction of a time difference between the first floating timing reference and the received timing reference, the predetermined fraction being less than unity, without requiring a timing adjustment instruction from a centralized synchronization controller.

2. The method of claim 1, wherein the deriving step comprises the step of correcting the received timing reference according to an estimated transmission delay between the first and second base stations.

3. The method of claim 1, wherein the monitoring step comprises the step of monitoring a plurality of second base stations, thereby generating a plurality of received signals, and wherein the adjusting step comprises the step of adjusting the first floating timing reference as a function of a corresponding plurality of received timing references derived from the plurality of received signals.

4. The method of claim 1, further comprising the step of disallowing transmissions by the first base station until the first base station achieves a predetermined level of synchronization with the second base station, wherein the adjusting step comprises the step of adjusting the first floating timing reference by a time difference between the first floating timing reference and the received timing reference.

5. The method of claim 1, wherein the adjusting step comprises the step of adjusting the first floating timing reference by no more than a predetermined limit.

6. The method of claim 1, further comprising in the first base station the steps of:

maintaining a history of actions taken during previously executed adjusting steps;

comparing an action indicated for a current adjusting step with the history of actions; and generating an alert when the comparing step detects that the action indicated is not converging on synchronization.

7. The method of claim 1, further comprising the steps of:

transmitting, by the second base station, location information identifying a geographic location at which the second base station is positioned; and determining, by the first base station, an estimated transmission delay between the first and second base stations, by comparing the location information with corresponding location information stored in the first base station and identifying the geographic location of the first base station.

8. The method of claim 1, wherein the first base station operates in a first communication system, and wherein the second base station operates in a second communication system different from the first communication system, and wherein the first floating timing reference of the first base station provides a common timing reference utilized for a plurality of base stations in the first communication system, and wherein the adjusting step comprises the step of adjusting the common timing reference according to the received timing reference.

9. The method of claim 1, further comprising in a controller of the communication system the step of generating artificial user traffic through the second base station when actual user traffic through the second base station is below a predetermined threshold.

10. The method of claim 1,
wherein the monitoring step comprises the step of monitoring a plurality of second base stations, thereby generating a plurality of received signals, and
wherein the deriving step comprises the step of deriving a plurality of timing references that indicate a requirement for conflicting adjustments of the first floating timing reference, and
wherein, in response to the requirement, the adjusting step comprises the step of adjusting the first floating timing reference in accordance with a pre-programmed technique for handling an adjustment conflict, and
wherein the method further comprises the step of generating an alert in response to the requirement.

11. A first base station for synchronizing a first floating timing reference of the first base station with a timing reference of a second base station of a communication system, without requiring an interruption of normal user traffic through the communication system, the first base station comprising:
a first transmitter for transmitting user traffic in synchronism with a second transmitter of the second base station;
a receiver for monitoring a user traffic transmission of the second base station only during predetermined time intervals, thereby generating a received signal;
a processing system coupled to the receiver for deriving a received timing reference from the received signal, and coupled to the first transmitter for controlling the first transmitter;
the first floating timing reference coupled to the processing system for providing a timing signal for the first base station; and
a controller interface coupled to the processing system for receiving the user traffic from a system controller,
wherein the processing system is programmed to:
control the first transmitter to utilize, for the normal user traffic, a transmission protocol that requires both simulcast transmissions and non-simulcast, location-directed transmissions, so that monitoring of the second base station can occur during said predetermined time intervals when the first base station is silenced for ones of the location-directed transmissions of the second base station; and
independently adjust the first floating timing reference by a predetermined fraction of a time difference between the first floating timing reference and the received timing reference, the predetermined fraction being less than unity, without requiring a timing adjustment instruction from a centralized synchronization controller.

12. The first base station of claim 11, wherein the processing system is further programmed to correct the received timing reference according to an estimated transmission delay between the first and second base stations.

13. The first base station of claim 11,
wherein the processing system is further programmed to adjust the first floating timing reference as a function of a corresponding plurality of received timing references derived from a plurality of received signals, in response to the receiver monitoring a plurality of second base stations, thereby generating the plurality of received signals.

14. The first base station of claim 11, further comprising the step of
wherein the processing system is further programmed to:
disallow transmissions by the first base station until the first base station achieves a predetermined level of synchronization with the second base station; and
adjust the first floating timing reference by a time difference between the first floating timing reference and the received timing reference.

15. The first base station of claim 11,
wherein the processing system is further programmed to adjust the first floating timing reference by no more than a predetermined limit.

16. The first base station of claim 11, wherein the processing system is further programmed to:
maintain a history of actions taken during previously executed adjusting steps;
compare an action indicated for a current adjusting step with the history of actions; and
generate an alert when the processing system detects that the action indicated is not converging on synchronization.

17. The first base station of claim 11,
wherein the second base station is arranged to transmit location information identifying a geographic location at which the second base station is positioned; and
wherein the processing system is further programmed to determine an estimated transmission delay between the first and second base stations, by comparing the location information with corresponding location information stored in the first base station and identifying the geographic location of the first base station.

18. The first base station of claim 11,
wherein the first base station is arranged and coupled to operate in a first communication system, and
wherein the second base station is arranged and coupled to operate in a second communication system different from the first communication system, and
wherein the first floating timing reference of the first base station is arranged to provide a common timing reference utilized for a plurality of base stations in the first communication system.

19. The first base station of claim 11,
wherein the processing system is further programmed to derive a plurality of timing references, in response to the receiver's monitoring a plurality of second base stations, thereby generating a plurality of received signals, and
wherein, in response to the plurality of received signals indicating a requirement for conflicting adjustments of the first floating timing reference, the processing system is further programmed to adjust the first floating timing reference in accordance with a pre-programmed technique for handling an adjustment conflict, and
wherein the processing system is further programmed to generate an alert in response to the requirement.

* * * * *